United States Patent [19]
Eandi

[11] Patent Number: 5,906,466
[45] Date of Patent: May 25, 1999

[54] PLUG WASHER

[76] Inventor: Roger E. Eandi, 4201 Bemis, Oakland, Calif. 94605

[21] Appl. No.: 08/417,362

[22] Filed: Apr. 5, 1995

[51] Int. Cl.⁶ .................................................... F16B 43/00
[52] U.S. Cl. .................................... 411/538; 5/537; 5/531
[58] Field of Search ..................... 411/537, 538, 411/531, 546, 535, 536, 473; 405/262, 259.1, 259.2, 259.4, 259.5, 259.6

[56] References Cited

U.S. PATENT DOCUMENTS

| | | | |
|---|---|---|---|
| 799,783 | 9/1905 | Ette | 411/537 |
| 3,311,012 | 3/1967 | Williams | 405/259.2 |
| 3,316,797 | 5/1967 | Williams | 405/259.5 |
| 3,336,758 | 8/1967 | Williams | 405/259.2 |
| 3,377,807 | 4/1968 | Nave | 405/259.4 |
| 3,541,798 | 11/1970 | Schnabel | 405/262 |
| 3,753,354 | 8/1973 | Bauer | 405/259.2 |
| 5,147,151 | 9/1992 | Hipkins | 411/537 |

FOREIGN PATENT DOCUMENTS 189990  12/1922  United Kingdom ................... 411/538

*Primary Examiner*—Brian K. Green
*Assistant Examiner*—Fredrick Conley
*Attorney, Agent, or Firm*—Glen R. Grunewald

[57] ABSTRACT

A plug washer useful for holding a vertical stud support member against a masonry wall using studs embedded in the masonry wall at an oblique angle to horizontal, the plug washer having an expanded washer portion which bears against the steel support on one side and a nut on the other, and further having a plug that fits in holes in the support member made to accept the stud, the plug and the washer portion having a hole passing through them at an angle to receive the stud.

4 Claims, 2 Drawing Sheets

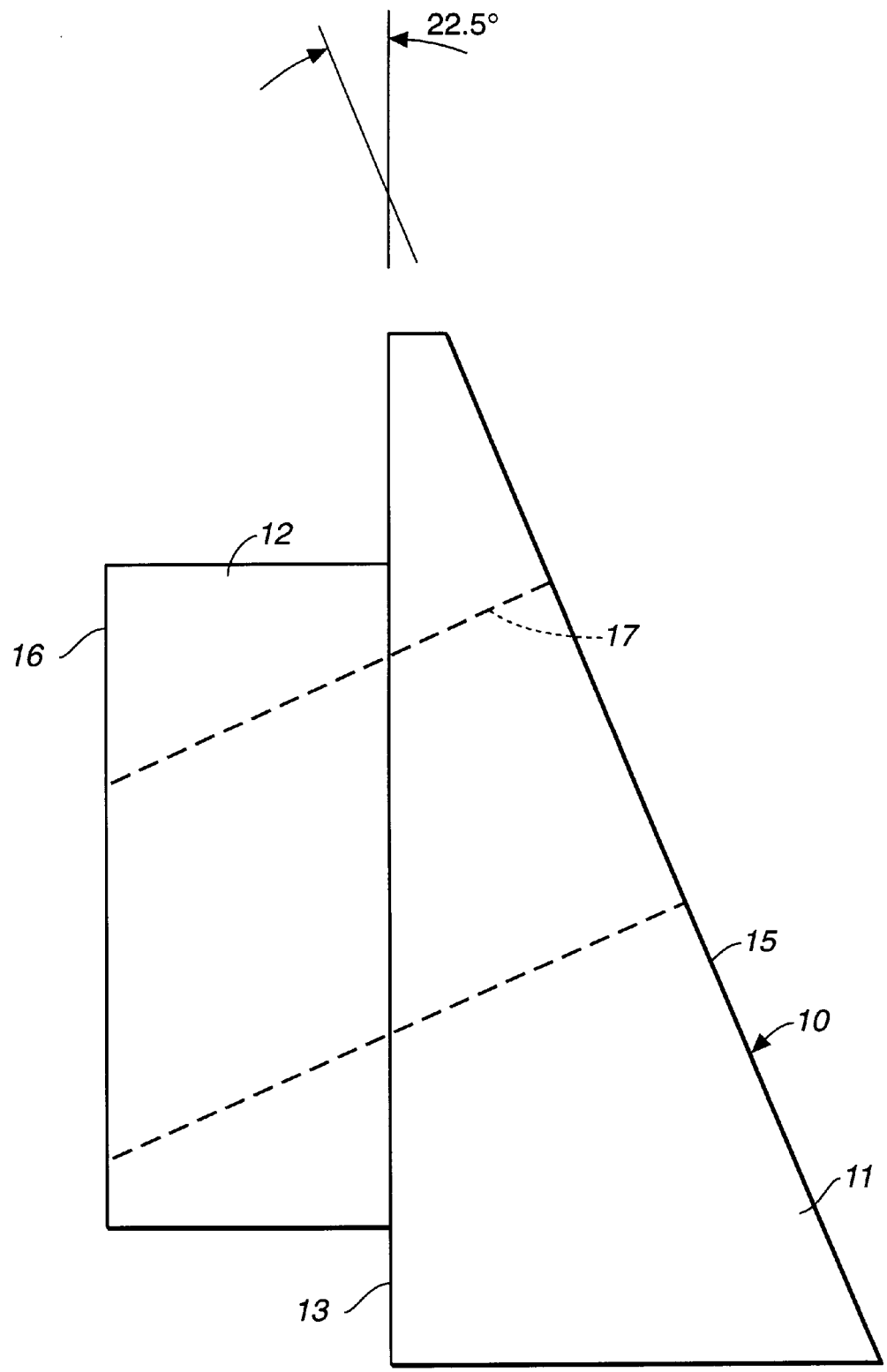
FIG._1

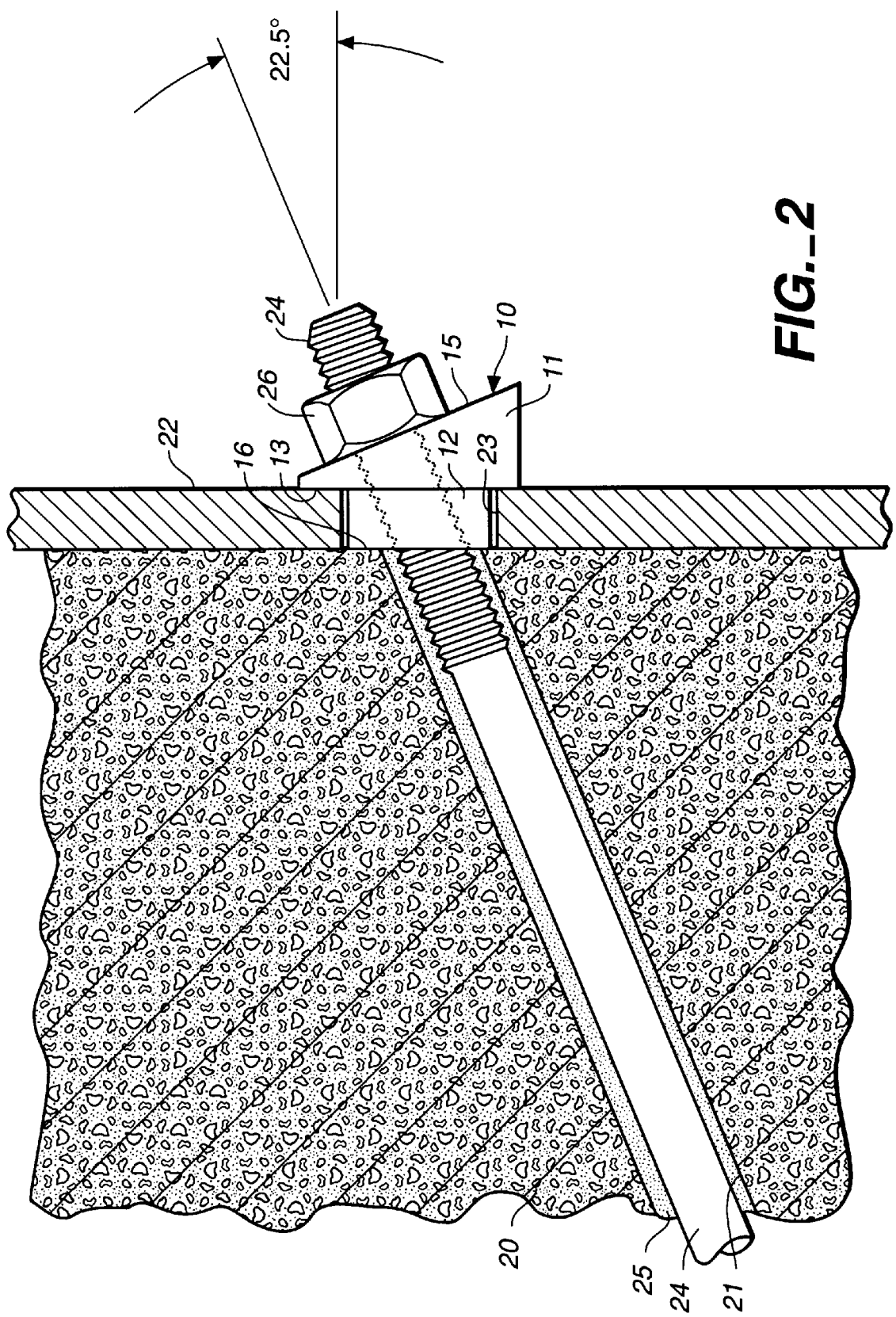
FIG._2

PLUG WASHER

FIELD OF THE INVENTION

This invention is in the field of attaching steel support members to structures made of masonry walls.

BACKGROUND ART

This invention is a plug washer that is useful for connecting steel support members to masonry walls, such as walls made of concrete, brick, cement block, stone or the like, all hereinafter referred to as masonry. Although masonry walls have great ability to resist compressive loads, they are not good at resisting horizontal stresses. Masonry walls are particularly vulnerable in regions subject to earthquakes. Older structures in earthquake-prone regions or structures damaged by earthquakes should be retrofitted to resist earthquakes or provided with a steel support structure when being repaired after being damaged in an earthquake.

To retrofit structures for earthquake resistance it is common to build a supporting steel framework adjacent to the masonry walls to prevent horizontal stresses from toppling the walls. The supporting steel framework is usually built inside the structure and the supporting steel must be firmly connected to the masonry walls to hold the support structure and the masonry walls together. This is usually accomplished by drilling holes in the masonry and in the support steel, embedding studs in the holes in the masonry so that they extend through corresponding holes in the steel support framework and then connecting the framework to the wall with nuts, or the like, to hold the steel framework in supporting relationship with the masonry. It has been determined that a stud embedded in masonry at an angle oblique to horizontal will have greater strength than one embedded to extend horizontally, from the masonry wall. It has further been determined that a stud embedded at an angle of 22.5 degrees from horizontal provides the strongest connection.

There are many ways to embed studs in masonry including expansion elements of various types placed in holes in the masonry and then expanded by the torque of a bolt screwed into the expansion element. A very suitable way to embed a stud in a masonry wall is to put epoxy cement in a hole in the wall and to insert a stud in the hole so that the epoxy surrounds it. The amount of epoxy placed in the hole is such that when it is displaced by insertion of the stud it will just fill the hole. The bond between epoxy and masonry is stronger than the masonry itself and the bond is also stronger than the stud. An epoxy resin can be made viscous enough to flow from such a hole very slowly.

One problem with such a system is that it is difficult to have pre-drilled holes in masonry and pre-drilled or punched holes in steel support members correspond when they are placed together. A drill bit characteristically "walks" from the desired center of the hole when drilling starts so that the centers of the holes in masonry and the holes in the steel support member do not exactly correspond. In such cases the studs extending from the masonry wall cannot pass through the holes in the steel support member that were drilled or punched to receive them. When the studs extending from a masonry wall do not correspond in position with the pre-prepared holes in a steel support member costly and time-consuming revision of the holes or the studs must be made to provide adequate support. Another problem is that a nut screwed onto a stud that is at an oblique angle from horizontal cannot make a flat bearing against a vertical steel support element. Tightening a nut that is at an angle to its proposed bearing surface will provide unreliable holding force and it will tend to cause the stud to bend which reduces the ultimate strength of the stud.

Although washers are known that accommodate to surfaces that are at an oblique angle to a stud, those washers have a central hole that is much larger than the diameter of the stud that is to be received in that hole because the central hole must accommodate the stud passing through it at an angle oblique to horizontal. Even if a washer lies flat against the support member, the nut on such a stud cannot bear flatly against the washer because of the angle of the stud. The bearing force of a nut accordingly is not uniformly distributed on the washers so that the holding force of the nut is diminished. Additionally, in studs that are held with epoxy or other liquid-phase or plastic cement, some of the cement may flow out of the hole in the masonry thereby diminishing the strength of the bond.

DISCLOSURE OF THE INVENTION

This invention is a plug washer that avoids or greatly mitigates the above-mentioned problems. The washer of this invention provides a hole for a bolt or stud that is at the same angle to horizontal as the axis of the stud, it is only slightly larger in diameter than the stud so that it provides a unitary structure that bears flatly against both the nut and the support structure. Additionally it prevents cement from flowing from a hole in masonry, it provides means to avoid misalignment of the stud and its corresponding hole in a support member and it provides that the force exerted by a nut screwed onto a stud is uniformly distributed on all bearing surfaces and throughout the body of the stud. The plug washer of this invention is also easily removable should the structure on which it is used is to be revised or demolished.

The plug washer of this invention is used to hold a vertically oriented structure steel piece against a vertically oriented wall by the use of studs embedded in the wall at an angle oblique to horizontal, preferably an angle of 22.5 degrees. The plug washer of this invention has a washer portion and a plug portion. The washer portion has a nut-bearing surface and a structure-bearing surface and the two surfaces diverge from one another at the oblique angle at which the axis of the studs are set in the masonry wall. The plug washer of this invention also has a plug portion that extends from the structure-bearing surface. The plug portion is preferably cylindrical, it is of smaller diameter than the washer portion and it extends with its axis perpendicular to the support-bearing surface of the plug washer.

A common passageway passes through both the washer portion and the plug portion. The axis of the passageway is perpendicular to the nut-bearing surface of the plug washer. The plug washer of this invention permits a structural steel element to be fixed to a masonry wall quickly, it permits accurate drilling of holes in masonry, it positions all bearing surfaces to be flat against one another and all force on a stud to be exerted axially, and it seals the cement in holes in masonry while the cement sets.

BRIEF DESCRIPTION OF THE DRAWINGS

FIG. 1 is a side elevation of a plug washer embodying this invention.

FIG. 2 is a side view partly in cross section of the plug washer of FIG. 1 installed to hold a structural steel member to a masonry wall.

DETAILED DESCRIPTION OF THE INVENTION

A plug washer embodying this invention is illustrated in FIG. 1. The plug washer is generally designated 10. It consists of a washer element 11 and a plug element 12. The washer element 11 includes a steel support-bearing surface 13 and a nut-bearing surface 15. The plug portion 12 is preferably cylindrical with its axis perpendicular to structural steel-bearing surface 13. The surface 16 of plug 12 is simply the end of the plug but it is useful for sealing cement in a hole in masonry as will be discussed hereafter.

The plug washer of this invention includes a cylindrical passageway 17. The axis of passageway 17 is perpendicular to nut-bearing surface 15. The support-bearing surface 13 and the nut-bearing surface 15 diverge at an angle of 22.5 degrees in the particular embodiment illustrated but in any case they will diverge at the angle that the stud to be described hereafter makes with horizontal.

FIG. 2 illustrates the plug washer of this invention installed to hold a steel support element 22 against a masonry wall 20. A stud 24 is inserted into a hole 21 which has been drilled into the masonry wall. The hole 21 is larger in diameter than the stud 24 whereby a space 25 is formed to receive epoxy or other suitable cement. To install the steel support element 22 against the masonry wall 20 the support element is preferably temporarily held tightly against the wall 20 with a pre-punched or -drilled hole 23 exposing a portion of the masonry wall. A drill adapted to drill a hole at 22.5 degrees from horizontal (in this case) is passed through the hole 23 and the hole 21 is drilled with the bit passing through the hole 23. By drilling the hole in this way the alignment of the hole 21 and the hole 23 is assured. When all of the holes in the masonry have been drilled employing this technique, the holes in the concrete can be blown free of dust and filled with enough epoxy so that upon displacement by insertion of the stud 24 the space 25 around the stud 24 will be substantially filled with epoxy. Before the studs 24 are inserted in the epoxy-filled holes the plug washer is inserted in the hole 23 so that the plug virtually fills the hole and the surface 16 is in contact or almost in contact with the concrete wall 20. At that point the stud is inserted through the hole 17 in the plug washer and into the hole 21 in the masonry. When inserted in the hole 21 the stud 24 displaces the epoxy so that it virtually fills the hole 21 and completely surrounds the stud 24. The assembly is then permitted to stand until the epoxy sets whereby an extremely strong bond between the stud 24 and the masonry wall 20 is formed. When the strong bond is formed the nut 26 is screwed onto the threaded end of stud 24 and tightened to provide sufficient holding force to cause steel element 22 to reinforce masonry wall 20 and prevent damage due to horizontal thrusts.

It is evident from FIG. 2 that the surface 15 of the washer portion bears flatly against nut 26 and that the surface 13 of the washer portion bears flatly against the steel support element 22. It is also evident that although the stud passes through the plug portion at an angle of 22.5 degrees, the plug functions only to fill the hole 23 and to position the passageway 17 so that it is coaxial with the hole 21. All forces exerted by the torque on nut 26 are axial forces with regard to stud 24 and are perpendicular forces with regard to nut-bearing surface 15. Any sheer force urging plug portion 12 downwardly, as illustrated in FIG. 2, is resisted by a perpendicular force against the sides of hole 23 whereby the stud 24 is subjected almost entirely to axial tensile stress.

The plug washer of this invention may be made of any suitable material.

I claim:

1. A plug washer for use with a stud embedded in a vertical wall for attachment to a vertical metal support standing adjacent to said wall, said stud to extend from said wall at an angle oblique to horizontal and through said metal support comprising a washer portion having a support-bearing surface and a nut-bearing surface, said support-bearing surface and said nut-bearing surface diverging at said oblique angle, a cylindrical plug portion having a smaller diameter than said washer portion and extending from said support-bearing surface with its axis perpendicular to said support-bearing surface, a passageway to receive said stud extending through said washer portion and said plug portion with the axis of said passageway perpendicular to said nut-bearing surface.

2. The plug washer of claim 1 wherein said angle is from about 20 degrees to about 25 degrees.

3. The plug washer of claim 2 wherein said angle is 22.5 degrees.

4. The plug washer of claim 1 wherein said plug portion extends from said support-bearing surface a distance substantially equal to the thickness of said metal support.

\* \* \* \* \*